US012665364B2

(12) United States Patent
Dubuc et al.

(10) Patent No.: US 12,665,364 B2

(45) Date of Patent: Jun. 23, 2026

(54) BRIDGING CONNECTOR, CONNECTION ASSEMBLY, VEHICLE LAMP, AND VEHICLE

(71) Applicant: VALEO VISION, Bobigny (FR)

(72) Inventors: Cyril Dubuc, Bobigny (FR); David Boudikian, Bobigny (FR); Haiqing Zhou, Wuhan (CN); Chuyun Yao, Wuhan (CN)

(73) Assignee: VALEO VISION, Bobigny (FR)

( * ) Notice: Subject to any disclaimer, the term of this patent is extended or adjusted under 35 U.S.C. 154(b) by 406 days.

(21) Appl. No.: 18/256,357

(22) PCT Filed: Dec. 9, 2021

(86) PCT No.: PCT/EP2021/085095

§ 371 (c)(1),
(2) Date: Jun. 7, 2023

(87) PCT Pub. No.: WO2022/122978

PCT Pub. Date: Jun. 16, 2022

(65) Prior Publication Data

US 2024/0014612 A1 Jan. 11, 2024

(30) Foreign Application Priority Data

Dec. 11, 2020 (CN) ......................... 202022984460.6

(51) Int. Cl.
*H01R 25/16* (2006.01)
*F21S 43/19* (2018.01)
(Continued)

(52) U.S. Cl.
CPC .......... *H01R 25/165* (2013.01); *F21S 43/195* (2018.01); *H01R 12/523* (2013.01); *H01R 12/585* (2013.01); *H01R 2201/26* (2013.01)

(58) Field of Classification Search
CPC .... H01R 12/716; H01R 12/724; H01R 12/58; H01R 12/57; H01R 12/585; H01R 12/721;
(Continued)

(56) References Cited

U.S. PATENT DOCUMENTS

| | | | | |
|---|---|---|---|---|
| 4,768,971 A * | 9/1988 | Simpson | H01R 12/82 439/493 |
| 5,263,868 A * | 11/1993 | Renn | H01R 12/52 439/493 |

(Continued)

FOREIGN PATENT DOCUMENTS

| | | |
|---|---|---|
| JP | 2016-4665 A | 1/2016 |
| WO | WO 00/72400 A1 | 11/2000 |

OTHER PUBLICATIONS

International Search Report issued Apr. 5, 2022 in PCT/EP2021/085095 filed on Dec. 9, 2021, 2 pages.

(Continued)

*Primary Examiner* — Truc T Nguyen
(74) *Attorney, Agent, or Firm* — Oblon, McClelland, Maier & Neustadt, L.L.P.

(57) ABSTRACT

A design of a bridging connector, a connection assembly, a vehicle lamp, and a vehicle. The bridging connector is used to connect circuit board components arranged on a carrier, and the circuit board component is provided with electrical contact holes and has a board surface. The bridging connector includes a housing with contact surfaces and contact bodies arranged in the housing. In the installed state, the contact surfaces are in contact with the board surface, and the contact bodies are located in the electrical contact holes in a manner of being in contact with the electrical contact holes. The housing is provided with guide holes, and the guide holes cooperate with guide pins provided on the
(Continued)

carrier so that the contact bodies occupy a predetermined position with respect to the electrical contact holes.

19 Claims, 4 Drawing Sheets

(51) Int. Cl.
*H01R 12/52* (2011.01)
*H01R 12/58* (2011.01)

(58) Field of Classification Search
CPC . H01R 13/6658; H01R 12/7076; H01R 12/52
See application file for complete search history.

(56) References Cited

U.S. PATENT DOCUMENTS

| | | | | |
|---|---|---|---|---|
| 6,034,876 | A * | 3/2000 | Ohno | H01R 12/724 361/752 |
| 6,188,583 | B1 * | 2/2001 | Fendt | H05K 7/142 361/752 |
| 6,464,510 | B1 | 10/2002 | Len | |
| 6,589,074 | B1 * | 7/2003 | Wu | H01R 12/7052 439/567 |
| 7,618,283 | B1 * | 11/2009 | Costello | H01R 12/52 439/511 |
| 7,963,796 | B2 * | 6/2011 | Sypolt | H01R 12/732 439/511 |
| 10,038,262 | B1 * | 7/2018 | Behziz | H01R 12/7082 |
| 2008/0171451 | A1 | 7/2008 | Shin et al. | |
| 2010/0003853 | A1 * | 1/2010 | Chuang | H01R 13/6658 439/607.22 |
| 2011/0104911 | A1 | 5/2011 | Sypolt et al. | |
| 2017/0237190 | A1 * | 8/2017 | Liao | H01R 12/79 439/64 |
| 2019/0334272 | A1 * | 10/2019 | Hsu | H01R 12/714 |
| 2021/0119361 | A1 * | 4/2021 | Perry | H01R 12/7047 |
| 2021/0119363 | A1 * | 4/2021 | Perry | H05K 3/368 |
| 2022/0166155 | A1 * | 5/2022 | Su | H01R 12/57 |

OTHER PUBLICATIONS

European Office Action issued Jun. 24, 2025, in European Patent Applicant No. 21835700.2, 7 pages.

* cited by examiner

BRIDGING CONNECTOR, CONNECTION ASSEMBLY, VEHICLE LAMP, AND VEHICLE

TECHNICAL FIELD

The present application relates to a bridging connector, a connection assembly, a vehicle lamp and a vehicle.

BACKGROUND ART

In an electrical system, a plurality of circuit board components are usually used to transmit information or energy flows. For this purpose, the corresponding circuit boards need to be electrically coupled together.

A known method for electrically coupling circuit boards is providing additional connectors on the circuit boards to be connected, and then establishing a connection between the corresponding circuit boards through a separately provided flexible wire harness or conductive tape with matching connectors.

Another known method is establishing a connection between the corresponding circuit boards by directly welding together connecting bodies and the corresponding circuit boards.

SUMMARY OF THE APPLICATION

Therefore, an objective of the present application is to provide a bridging connector that can establish a connection between circuit board components in a simple manner.

According to the present application, this objective is achieved by proposing a 25 bridging connector for connecting circuit board components arranged on a carrier, wherein the circuit board component is provided with electrical contact holes and has a board surface, the bridging connector comprises a housing with contact surfaces and contact bodies arranged in the housing, in the installed state, the contact surfaces are in contact with the board surface, and the contact bodies are located in the electrical contact holes in a manner of being in contact with the electrical contact holes, wherein the housing is provided with guide holes, and the guide holes cooperate with guide pins provided on the carrier so that the contact bodies occupy a predetermined position with respect to the electrical contact holes.

With such a bridging connector, during installation, it is only necessary to align the guide holes in the housing with the guide pins and push the guide pins into the guide holes, so that the contact bodies of the bridging connector are correctly positioned with respect to the electrical contact holes and led into the electrical contact holes, thereby establishing a simple electrical connection between the circuit boards.

According to an embodiment of the present application, contact surfaces are arranged at an angle, wherein an angle formed by the contact surfaces matches an angle formed by the board surfaces of the circuit board component. This is particularly suitable for non-coplanar arrangement of circuit board components.

According to an embodiment of the present application, at least one end of a guide hole that faces a contact surface is in the shape of an open horn. This is beneficial to guiding the guide pins into the guide holes.

According to an embodiment of the present application, a contact body has a connecting portion and terminals on both sides of the connecting portion, wherein the terminals are correspondingly perpendicular to the contact surface. Therefore, since the electrical contact holes of a circuit board component are usually perpendicular to the board surface of the circuit board component, when the contact surface comes into contact with the board surface of the circuit board component, the orientation of the terminals corresponds to the longitudinal orientation of the electrical contact holes, which is beneficial to guiding the terminals into the electrical contact holes.

According to an embodiment of the present application, the top section of the terminal is in the shape of a needle eye and at least the tip thereof is tapered. The top section is elastically deformable, and a distance from one opposite side is greater than the diameter of an electrical contact hole. Therefore, the terminal is inserted into an electrical contact hole in an interference fit, and, when possible, a connection between the connector and a printed circuit board component may be established without additional soldering.

According to an embodiment of the present application, the terminal protrudes from the housing in a cantilever manner. This allows the terminal itself to at least partially deform, thereby compensating for possible tolerances.

According to an embodiment of the present application, a groove is provided on a wall portion of the housing, so that an angle formed by the contact surfaces of the connector is flexibly adjustable according to the arrangement of circuit board components.

According to another aspect of the present application, a connection assembly is provided, which comprises a carrier, at least two circuit board components and the above-described bridging connector, wherein the circuit board components are arranged on the carrier, and the circuit board components are connected by the bridging connector.

According to an embodiment of the present application, the carrier has guide pins for circuit board components and for the bridging connector. The guide pins are used to ensure the correct positioning of the circuit board components between each other and that of the circuit board components with respect to the carrier, and finally the bridging connector is guided, through the guide pins, to occupy a predetermined position with respect to the circuit board components.

According to an embodiment of the present application, the carrier has a plurality of units in the form of reflectors, the units being arranged in a predetermined manner. Therefore, a circuit board component may have a light source, for example, a semiconductor light source, that is assigned to each unit.

According to another aspect of the present application, a vehicle lamp is provided, which has the above-described bridging connector or the above-described connection assembly.

According to an embodiment of the present application, the vehicle lamp is a tail light.

According to another aspect of the present application, a vehicle is provided, which has the above-described bridging connector, connection assembly, or vehicle lamp.

BRIEF DESCRIPTION OF THE DRAWINGS

The present application is further explained below with the aid of the drawings. Among the drawings, FIG. 1 schematically shows a bridging connector according to an embodiment of the present application.

SPECIFIC EMBODIMENTS

Embodiments of the present application will be described exemplarily below. As those skilled in the art should realize, the embodiments explained may be amended in various ways without departing from the concept of the present application. Thus, the accompanying drawings and the description are in essence demonstrative and non-limiting. In the following text, identical drawing reference labels generally indicate functionally identical or similar elements.

Figure 1:
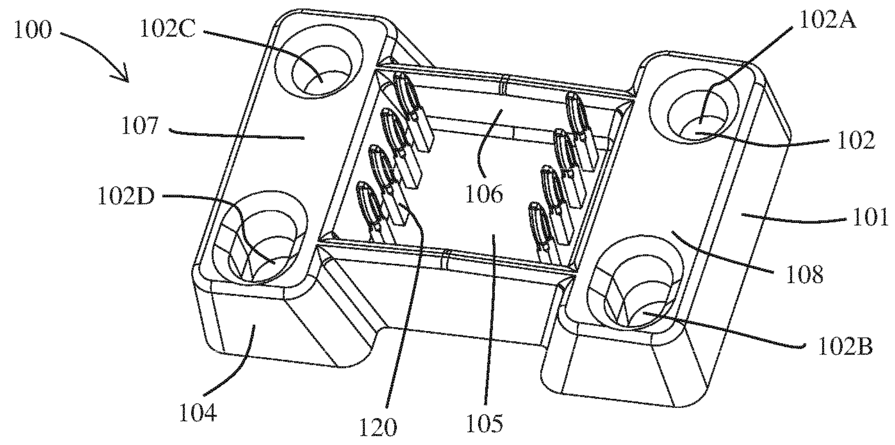
Figure 2:
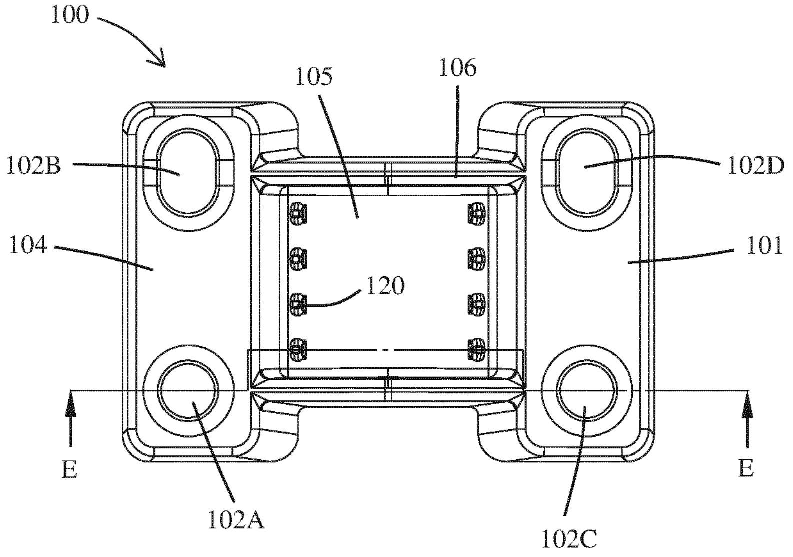
FIG. 2 shows a top view of the bridging connector in FIG. 1.

FIG. 1 schematically shows a bridging connector 100 according to an embodiment, which is used to connect the circuit board components 200, especially for mechanical and electrical coupling of the circuit board components 200. Before being connected by the bridging connector 100, the circuit board components 200 may have a predetermined position and orientation with respect to each other. It should be noted that although the drawings show the connection of only two circuit board components 200 through one bridging connector 100, it is also possible to connect more than two, for example, three, four, or more, circuit board components through one bridging connector 100.

Figure 4:
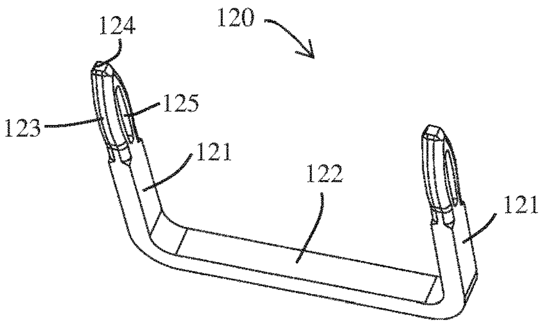
FIG. 4 shows a contact body of the bridging connector in FIG. 1.

The proposed bridging connector 100 has a housing 101 formed of a dielectric material, for example, by injection molding, and contact bodies 120 made of a conductive material that are accommodated in the housing 101 (see FIG. 4). The dielectric material may be selected from PA66, PA46, PBT, PA6T, PAST, PPS, LCP or other suitable materials, for example, and the conductive material may be selected from brass, phosphor bronze or other suitable materials, for example. If necessary, a contact body may be gold-plated or tin-plated or be subjected to another suitable treatment. Exemplarily, the housing 101 has a rigid structure or a flexible structure. A plurality of contact bodies 120 may be accommodated in the housing 101, and, as they are arranged side by side, they may also be referred to as pin headers.

As may be seen from FIG. 1, the housing 101 has four guide holes 102, referred to as 102A, 102B, 102C, and 102D, respectively, for a clearer explanation, and arranged on both sides of the housing 101 accordingly, which means that two guide holes are provided on each side. In the example shown, one of the two guide holes on each side is a round hole and the other is an elliptical hole. Certainly, a specific shape of each guide hole may be set as required.

The contact bodies 120 are centrally arranged in the housing 101. In the example shown, a recess 105 is formed in the section of the housing 101 for the contact bodies 120, and thus two opposite wall portions 106 are formed in the housing. The two ends of a contact body 120 protrude from the bottom of the recess 105.

In the example shown, the surface of the side from which the contact bodies 120 of the housing protrude consists of two surfaces 107, 108 (see FIG. 3), and they are inclined with respect to the horizontal plane H. As may be seen from the simplified drawing on the right of FIG. 3, the surface 107 on the right forms an angle α with the horizontal plane H. The surfaces 107 and 108 may be arranged symmetrically to each other, so that they form the same angle with the horizontal plane H. In an example not shown, the surfaces 107 and 108 may respectively form different angles with respect to the horizontal plane.

Figure 3:
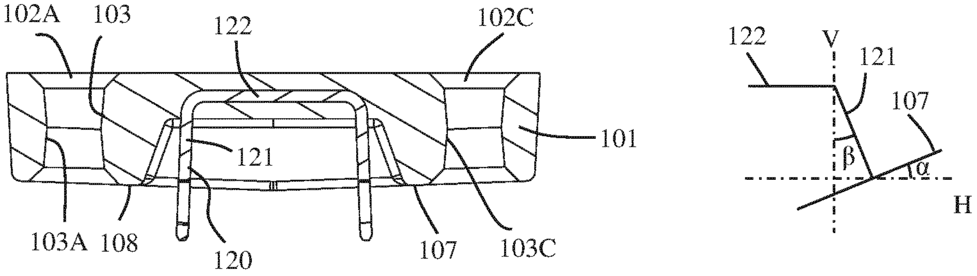
FIG. 3 shows a cross-sectional view of the bridging connector taken along the line E-E in FIG. 2.

An exemplary embodiment of the guide holes is shown in FIG. 3. The shown guide holes 102A and 102C, instead of being cylindrical holes with a constant cross-section in the longitudinal extension direction, may each be regarded as being formed by splicing two horn-shaped openings, wherein the large opening sides of the horn-shaped openings are on both sides of the guide hole. Therefore, the inner walls 103A and 103C of a guide hole first gradually become smaller and then gradually become larger in the longitudinal extension direction. This is particularly beneficial to guiding the provided guide pins into the guide holes.

FIG. 4 shows a three-dimensional view of a contact body 120, which is substantially U-shaped. The contact body 120 has a connecting portion 122 and terminals 121 on both sides of the connecting portion 122. The connecting portion 122 is completely enclosed in the housing 101. The terminal 121 is, for the most part, exposed from the housing 101, that is, protruding from the housing 101 in a cantilever manner, which makes the terminal 121 movable to a certain extent to compensate for the tolerance between the electrical contact holes of the circuit board component. The terminals 121 arranged on both sides should be respectively perpendicular to the contact surfaces 107 and 108 on the corresponding side. Therefore, as may be seen from the drawing on the right of FIG. 3, the terminal 121 forms an angle β with respect to the vertical plane V, wherein the angle α is equal to the angle β, which means that an angle formed by the terminal on the corresponding side and the vertical plane is equal to an angle between the bottom surface of the corresponding side of the housing and the horizontal plane.

In the example shown, the top section of the terminal 121 is in the shape of a needle eye and is tapered, which makes the top section elastically deformable. A distance between the outer side surfaces of the top section of the terminal 121 on both sides of the needle eye is greater than the diameter of the electrical contact holes 202 into which a circuit board component is to be inserted. Therefore, after insertion into the electrical contact holes 202, reliable contact between the top section of the terminal 121 and an electrical contact hole 202 may be achieved.

Figure 11:
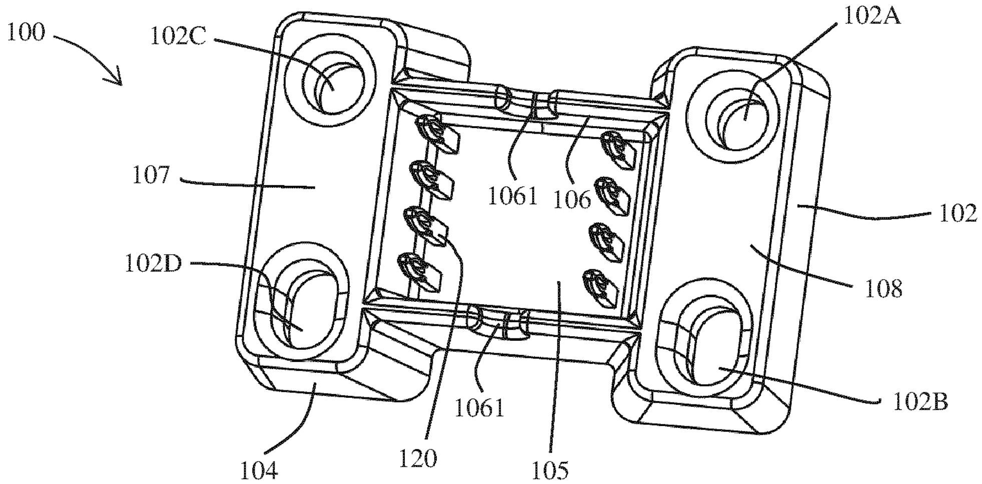
FIG. 11 shows a schematic diagram of a bridging connector provided with a groove on a wall portion thereof.

In the example shown in FIG. 11, a groove 1061 is provided on a wall portion 106 of the connector 100. The depth of the groove 1061 is smaller than or equal to the height of the wall portion 106. In the example shown in FIG. 11, the groove 1061 is provided in a middle position of the wall portion 106, and the depth of the groove 1061 is smaller than the height of the wall portion 106. However, in another example, a position of provision of and width of the groove 1061 may be adjusted as required, and the groove 1061 may also have a depth equal to the height of the wall portion 106, that is, penetrating the wall portion 106, which is not specifically limited in the present application. The provision of the groove 1061 can provide further convenience in adjusting an angle between the contact surfaces 107 and 108 of the connector 100 according to different arrangements of a circuit board component 200 to match the board surface 205 of the circuit board component 200.

Figure 5:
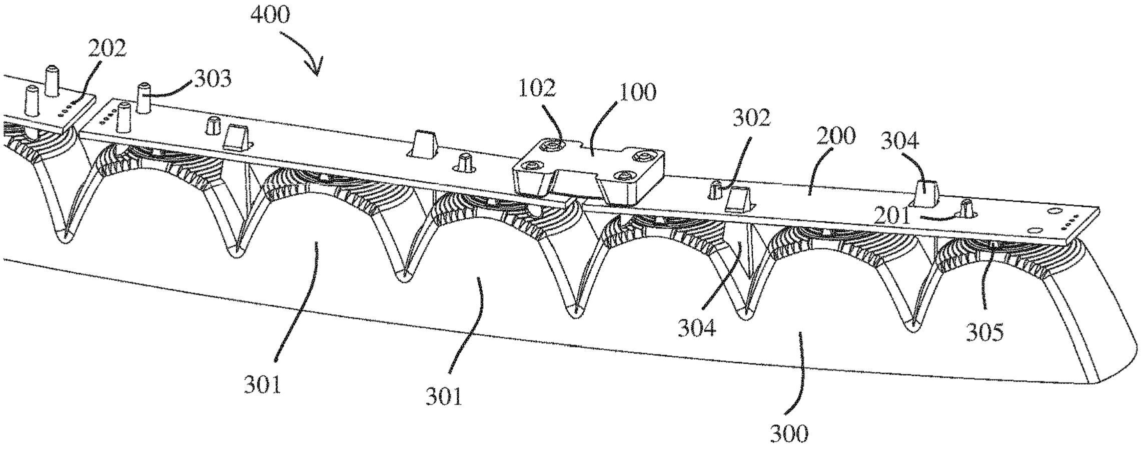
FIG. 5 schematically shows a connection assembly according to an embodiment of the present application.

FIG. 5 shows a connection assembly 400 according to an embodiment, which comprises a carrier 300 as well as circuit board components 200 and the above-described bridging connector 100 that are arranged on the carrier 300.

As shown in the figure, the circuit board components 200 are linearly arranged on the carrier 300.

Figure 6:
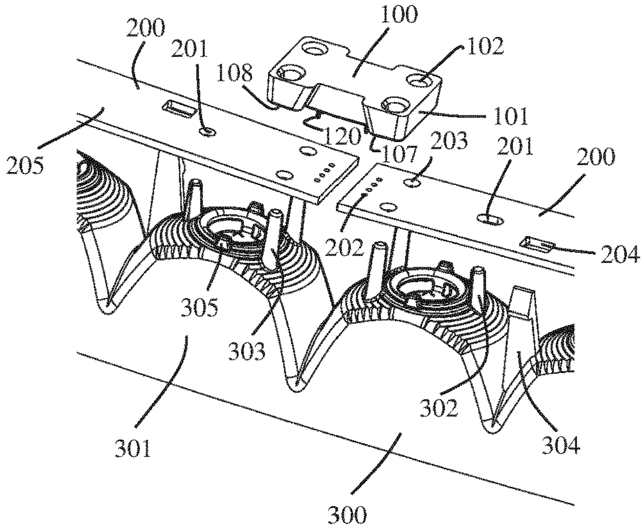
FIG. 6 partially shows an exploded view of the connection assembly in FIG. 5.
Figure 7:
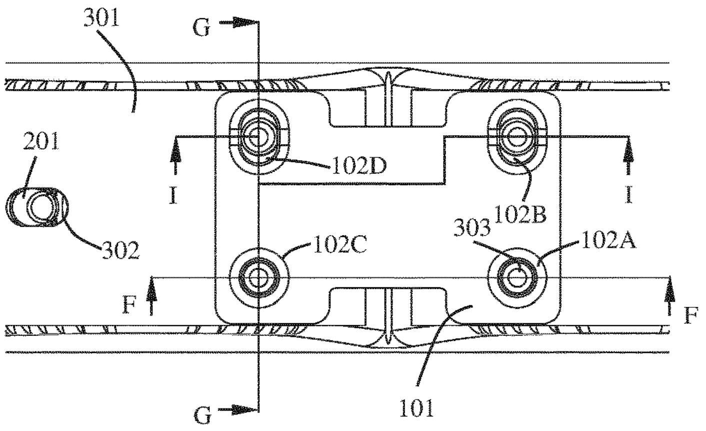
FIG. 7 partially shows a top view of the connection assembly in FIG. 5.

The carrier 300 has guide pins 302, 303 and hooks 304 for the circuit board components 200, and is provided with bosses 305 for the circuit board components 200 (see FIG. 6), the hooks 304 being elastically deformable, wherein the guide pins 302, 303 are used to limit the position of the circuit board components 200 in the lateral direction, and the hooks 304 and the bosses 305 are used to, in conjunction, limit the position of the circuit board components 200 in the vertical direction. For this purpose, a circuit board component 200 is provided with perforations 201 and 203 for guide pins 302 and 303, and perforations 204 for the hooks 304. The bosses 305 support a circuit board component 200 on one side, and the hooks 304 are hooked on the other side of the circuit board component 200.

In an embodiment that is not shown herein, a circuit board component 200 may also be fixed on the carrier 300 with screw members and, therefore, at least the hooks may be eliminated and the corresponding screw holes may be provided in the carrier 300. Certainly, other methods of fixation are also feasible.

The guide pins 303 of the carrier 300 are also used to be received in corresponding guide holes of the bridging connector 100, as may be seen in FIGS. 7 to 10. The peripheral side of each guide pin 303 is in contact with the narrowest part of the inner wall of the guide hole, thereby allowing the positioning of the bridging connector 100 with respect to the printed circuit board components to be connected, especially the electrical contact holes 202 thereof.

Figure 8:
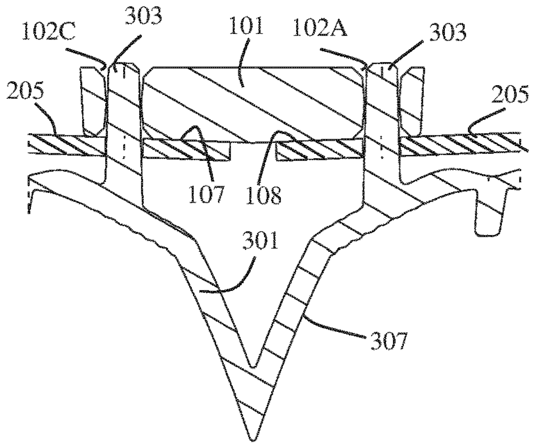
FIGS. 8 to 10 respectively show cross-sectional views taken along the lines F-F, G-G, and I-I in FIG. 7.
Figure 9:
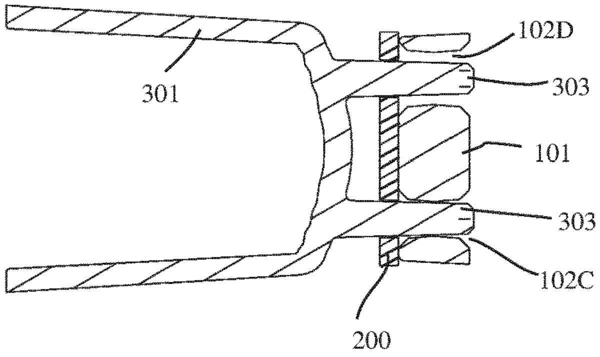
Figure 10:
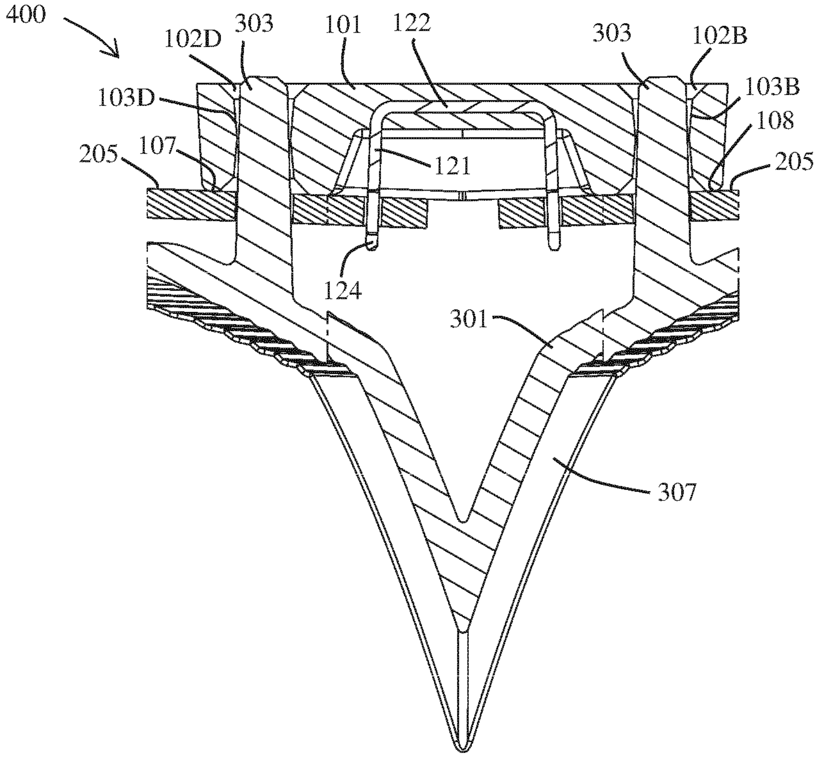

FIGS. 8 to 10 show cross-sectional views of the connected connection assembly 400. It is clear that the surfaces 107 and 108 on the lower side of the bridging connector respectively abut on the surface 205 of the connected printed circuit board component 200, and that the tips 124 of the terminals 121 protrude from one side of the printed circuit board component 200. The inner walls 103B, 103D of the guide holes 102B, 102D are provided in the same manner as the other guide holes.

The connection assembly shown may be used for vehicle lamps. To this end, the carrier 300 may be a reflective component that has linearly arranged reflector elements 301 according to the arrangement of a circuit board component. Therefore, the circuit board component may have a light source, for example, a semiconductor light source; the reflector element 301 has an opening for a light source and is provided with a reflecting plane 307. Preferably, the connection assembly shown is used for vehicle tail lights, in particular penetrative tail lights.

The present application, instead of being limited to the above-described structures, may also have other variants. Although the present application has already been described by means of a limited number of embodiments, those skilled in the art could, drawing benefit from this disclosure, design other embodiments which do not depart from the scope of protection of the present application disclosed herein. Thus, the scope of protection of the present application should be defined by the attached claims alone.

The invention claimed is:

1. A bridging connector for connecting circuit board components arranged on a carrier, wherein the circuit board component is provided with electrical contact holes and has a board surface, the bridging connector comprises a housing with contact surfaces and contact bodies arranged in the housing, in the installed state, the contact surfaces are in contact with the board surface, and the contact bodies are located in the electrical contact holes in a manner of being in contact with the electrical contact holes, wherein the housing is provided with guide holes, the guide holes cooperate with guide pins provided on the carrier, so that the contact bodies occupy a predetermined position with respect to the electrical contact holes, wherein the contact surfaces are arranged at an angle, wherein the angle formed by the contact surfaces matches an angle formed by the board surfaces of the circuit board components.

2. The bridging connector as claimed in claim 1, wherein at least one end of the guide hole that faces the contact surfaces is in the shape of an open horn.

3. The bridging connector as claimed in claim 1, wherein the contact body has a connecting portion and terminals on both sides of the connecting portion, wherein the terminals are correspondingly perpendicular to the contact surfaces.

4. The bridging connector as claimed in claim 3, wherein the top section of the terminal is in the shape of a needle eye and in that the tip thereof is tapered.

5. The bridging connector as claimed in claim 3, wherein the terminal protrudes from the housing in a cantilever manner.

6. The bridging connector as claimed in claim 1, wherein a groove is provided on a wall portion of the housing.

7. A connection assembly, wherein the connection assembly comprises a carrier, at least two circuit board components, and the bridging connector as claimed in claim 1, wherein the circuit board components are arranged on the carrier, and the circuit board components are connected by the bridging connector.

8. The connection assembly as claimed in claim 7, wherein the carrier has guide pins for the circuit board components and for the bridging connector.

9. The connection assembly as claimed in claim 7, wherein the carrier has a plurality of units in the form of reflectors, the units being arranged in a predetermined manner.

10. A vehicle lamp, wherein the vehicle lamp has the bridging connector as claimed in claim 1.

11. The vehicle lamp as claimed in claim 10, wherein the vehicle lamp is a tail light.

12. A vehicle, wherein the vehicle has the bridging connector as claimed in claim 1.

13. A connection assembly, wherein the connection assembly comprises a carrier, at least two circuit board components, and the bridging connector as claimed in claim 3, wherein the circuit board components are arranged on the carrier, and the circuit board components are connected by the bridging connector.

14. A vehicle lamp, wherein the vehicle lamp has the bridging connector as claimed in claim 4.

15. A vehicle, wherein the vehicle has the bridging connector as claimed in claim 3.

16. A connection assembly, wherein the connection assembly comprises a carrier, at least two circuit board components, and the bridging connector as claimed in claim 2, wherein the circuit board components are arranged on the carrier, and the circuit board components are connected by the bridging connector.

17. A vehicle lamp, wherein the vehicle lamp has the bridging connector as claimed in claim 2.

18. A vehicle, wherein the vehicle has the bridging connector as claimed in claim 2.

19. A connection assembly, wherein the connection assembly comprises a carrier, at least two circuit board components, and the bridging connector as claimed in claim

3, wherein the circuit board components are arranged on the carrier, and the circuit board components are connected by the bridging connector.

* * * * *